United States Patent [19]

Aubanel et al.

[11] Patent Number: 4,797,461

[45] Date of Patent: Jan. 10, 1989

[54] AMORPHOUS HIGH MOLECULAR WEIGHT COPOLYMERS OF ETHYLENE AND ALPHA-OLEFINS

[75] Inventors: Marie-Line Aubanel, Saint Mitre-les-Ramparts; Jean C. Bailly, Martigues, both of France

[73] Assignee: BP Chemicals Limited, London, England

[21] Appl. No.: 38,211

[22] Filed: Apr. 14, 1987

[30] Foreign Application Priority Data

Apr. 17, 1986 [FR] France ................................. 8605541

[51] Int. Cl.$^4$ ........................................... C08F 210/16
[52] U.S. Cl. ................................... 526/348.6; 523/175; 526/348; 526/348.2; 526/348.3; 526/348.4; 526/348.5
[58] Field of Search ................. 526/348, 348.2, 348.3, 526/348.4, 348.5, 348.6; 523/175

[56] References Cited

U.S. PATENT DOCUMENTS 3,351,079 11/1967 Gibson ................................. 137/13
4,677,172 6/1987 Zimmerman et al. ............. 526/142
4,736,002 4/1988 Allen et al. ......................... 526/348

OTHER PUBLICATIONS

Raff et al., Crystalline Olefin Polymer, Part I, Interscience Publ., N.Y., vol. XX, (1965) pp. 375–377.

Primary Examiner—Edward J. Smith
Attorney, Agent, or Firm—Brooks Haidt Haffner & Delahunty

[57] ABSTRACT

The invention relates to amorphous copolymers of ethylene and one or more alpha-olefins comprising from 3 to 12 carbon atoms, possessing a high molecular weight, a crystallinity index less than or equal to 1.0%, a content of units derived from ethylene comprised between 40 and 60 moles %, a content of units derived from propylene and/or 1-butene between 60 and 40 moles % and a content of units derived from alpha-olefins comprising 5 to 12 carbon atoms of less than or equal to 10 moles %. These copolymers of a practically completely amorphous character advantageously occur in the form of a powder which is easy to handle. They are obtained by copolymerization in the gas phase by means of a catalyst system of the Ziegler-Natta type, very stereospecific to the polymerization of propylene.

4 Claims, No Drawings

AMORPHOUS HIGH MOLECULAR WEIGHT COPOLYMERS OF ETHYLENE AND ALPHA-OLEFINS

The present invention relates to amorphous copolymers of a high molecular weight consisting of ethylene, propylene and/or 1-butene, and also optionally of one or more alpha-olefins comprising 5 to 12 carbon atoms. Ths invention also relates to a process for the preparation of these copolymers. These copolymers are particularly applicable as drag-reducing agents in the conveying of oil by Pipeline, or as additives in drilling muds in order to facilitate drilling operations.

It is known that the addition of polymers or copolymers of alpha-olefins with a high molecular weight and low crystallinity to hydrocarbons of petroleum origin has the effect of increasing the throughput of these hydrocarbons circulating in the pipelines, this phenomenon being related to a considerable reduction of losses by friction, especially when the flow takes place turbulently.

It is also known that the addition of polymers or copolymers of alpha-olefins with a high molecular weight to drilling muds makes it possible to reduce the output of energy necessary for the circulation of these muds.

The characteristics required by polymers or copolymers for such applications are primarily a highly amorphous structure, a very high molecular weight, a good solubility in petroleum hydrocarbons and a high resistance to shear forces.

It is known that polymers or copolymers of alpha-olefins can be prepared by means of a catalyst system of the Ziegler-Natta type consisting on the one hand of a catalyst comprising a transition metal compound, such as titanium tetrachloride, vanadium tetrachloride or vanadyl trichloride and, on the other hand, of a co-catalyst comprising an organometallic compound, such as a compound of trialkylaluminium. Copolymers of alpha-olefins prepared in the presence of a catalyst system containing a vanadium compound are generally highly amorphous, but their chain structure is not highly resistant to shear forces.

It is known that copolymers of ethylene and a $C_3$ to $C_6$ alpha-olefin containing 20-70 moles % of ethylene and having a high molecular weight can be obtained using a catalyst system containing a titanium compound by a process of copolymerisation in the liquid phase, either in the presence of an inert diluent such as a liquid hydrocarbon, or in the absence of this inert diluent, but in the presence of liquid monomers such as propylene. Generally the copolymerisation is performed in the presence of a liquid hydrocarbon employed as solvent, and the conditions of the reaction are such that one obtains solutions of polymers or copolymers in this liquid hydrocarbon which do not exceed a few per cent by weight of copolymers, bearing in mind the limited solubility of these products and the high viscosity of these solutions. These copolymers cannot be easily separated from the liquid hydrocarbon because they occur in the form of solids with a pasty or sticky appearance. They are therefore employed in their application direct in the form of solutions. However, this necessitates the conveyance of large quantities to solvent on the actual site of drilling or pumping oil along the pipeline. Moreover, these copolymers of a high molecular weight, obtained by processes in the liquid-phase possess some residual crystallinity, their level of crystallinity being greater than 1% and it being possible for it to attain 5% or even 10%. This residual crystallinity affects not only the properties of these copolymers used as drag-reducing agents, or as additives to drilling muds, but also decreases the solubility of these products in hydrocarbons, such as petroleum hydrocarbons, so that they are employed in their application in a relatively large quantity to obtain the desired effects.

The present invention provides copolymers of ethylene, propylene and/or 1-butene, and optionally of alpha-olefins comprising 5 to 12 carbon atoms, having a very low or zero crystallinity and a very high molecular weight characterised by their intrinsic viscosity. In a particularly surprising manner, these amorphous copolymers occur in the form of a dry powder; thus, with these new products, it has been possible to reconcile two apparently opposing characteristics, that is to say the obtaining of amorphous copolymers, these copolymers being in the form of a powder consisting of solid and non-sticky particles. These copolymers may serve as drag-reducing agents in the conveyance of oil by pipeline, or as additives to drilling muds, without the disadvantages previously mentioned.

The present invention relates more especially to substantially amorphous copolymers of ethylene and one or more alpha-olefins comprising 3 to 12 carbon atoms, which copolymers are characterised in that they have a content of units derived from ethylene comprised between 40 and 60% molar, a content of units derived from propylene and/or 1-butene comprised between 60 and 40% molar and a content of units derived from alpha-olefins comprising 5 to 12 carbon atoms comprised between 0 and 10% molar, an intrinsic viscosity measured at 135° C. in decalin greater than 10 dl/g, a crystallinity level of the polyethylene type measured by X-ray diffraction less than or equal to 1.0%, a fusion enthalpy, measured by differential scanning calorimetry, less than or equal to 3 J/g, and substantially no inversion in the chain formation of units derived from alpha-olefins comprising 3 to 12 carbon atoms, these copolymers furthermore occurring in the form of a powder consisting of solid, non-sticky particles.

The contents of units derived from ethylene, and from alpha-olefins comprising 3 to 12 carbon atoms are generally measured by infrared spectrophotometry, this method being standardised using analysis by carbon 13 nuclear magnetic resonance ($C_{13}$ NMR). It is preferred to use $C_{13}$ NMR analysis to measure the various contents of monomeric units, in particular when the copolymer contains two different linear alpha-olefins comprising 3 to 12 carbon atoms.

The content of units derived from alpha-olefins comprising from 5 to 12 carbon atoms, according to the invention, should be comprised between 0 and 10% molar, and preferably comprised between 0.1 and 5% molar. These alpha-olefins may be chosen preferably from amongst 4-methyl-1-pentene, 1-hexene, 1-octene, 1-decene or 1-dodecene. The presence of the alpha-olefins comprising from 5 to 12 carbon atoms increases the solubility of the amorphous copolymers of the invention in hydrocarbons, such as petroleum hydrocarbons. Thus, copolymers of ethylene, propylene, and 1-hexene, copolymers of ethylene, 1-butene and 1-hexene, copolymers of ethylene, propylene and 4-methyl-1-pentene, copolymers of ethylene, 1-butene and 4-methyl-1-pentene, copolymers of ethylene, propylene and 1-octene or copolymers of ethylene, 1-butene and 1-octene are preferred.

The copolymers according to the invention have a very high molecular weight, characterised by an intrinsic viscosity measured at 135° C. in decalin, of greater than 10 dl/g, more particularly equal to or greater than 11 dl/g, and capable of attaining 15 dl/g or even more.

Analysis of the microstructure of the copolymers is performed by $C_{13}$ NMR. It has been found according to this analysis that the percentage of isolated units derived from ethylene by comparison with the total of units derived from ethylene is comprised between 15 and 30%, preferably comprised between 20 and 25%. Moreover, these copolymers possess from 5 to 20%, and preferably from 10 to 15% of units derived from methylene ($-CH_2-$), arranged in sequences corresponding to at least three consecutive units of ethylene, these sequences being on average composed of 6 to 10 units derived from ethylene. $C_{13}$ NMR analysis of the microstructure of the copolymers confirms that there is no inversion of structure in the chain formation of the units derived from propylene, and/or from 1-butene or from other higher alpha-olefins; in particular there is no chain formation of the head-to-head or tail-to-tail type. The absence of inversion of structure of this type is particularly surprising in a substantially amorphous copolymer. The absence of crystallinity of the very low level in the copolymers is determined by X-ray diffraction, on a copolymer sample having been previously melted at 200 C. and cooled slowly to ambient temperature (20° C.) over 1 hour. The crystallinity level of the polyethylene type of the copolymers according to the invention is equal to or less than 1.0%. The level of crystallinity of the polypropylene type or polybutene type is not measurable, which indicates that this level is very low, if not zero.

In accordance with the results concerning the crystallinity of thsse copolymers, it has been observed that the overall crystallinity of the copolymers according to the invention, determined by differential scanning calorimetry (DSC), is likewise very low if not zero. Differential scanning calorimetric analysis consists in recording the enthalpy graph of a sample of 5 mg of the copolymer by heating at the speed of 16° C. per minute up to 200° C., the sample having been previously subjected to a thermal treatment consisting of heating at the speed of 16° C. per minute up to 200° C., followed by maintenance at this temperature for 20 minutes and cooling at the speed of 16° C. per minute down to 50° C.; the area of the endothermal peak recorded during the heating is proportional to the fusion enthalpy. This differential scanning calorimetry analysis therefore enables the measurement of the fusion enthalpy of the copolymer corresponding to the quantity of heat necessary to melt 1 gramme of the copolymer. This quantity of heat is related to the spatial arrangement of the copolymer, it being higher, the more the structure of the copolymer is ordered. Thus, the fusion enthalpy of high-density polyethylene, whose spatial arrangement is regular, is comprised between 230 and 280 J/g under the measuring conditions described above, and that of isotactic polypropylene, whose spatial arrangement is likewise regular, is comprised between 200 and 210 J/g, under the same conditions. It is observed that the ( copolymers of the invention possess a fusion enthalpy equal to or less than 3 J/g under the measuring conditions described above.

The copolymers of the invention occur in the form of a powder consisting of solid, non-sticky particles at ambient temperature. Moreover this powder is easy to handle, that is to say it flows under its own weight, especially when it consists of particles of spheroidal form having a mean diameter by mass comprised between 100 and 1000 microns, preferably comprised between 150 and 800 microns, and a particle size distribution such that the ratio of the mean diameter by mass, Dm to the mean diameter by number, Dn, is lower than or equal to 3. The bulk density of this powder at rest may be comprised between 0.20 and 0.40 g/cm$^3$. Moreover, the density of the amorphous copolymers of the invention, measured by the ASTM-D-1505 method, is comprised between 0.850 and 0.870, preferably comprised between 0.850 and 0.860.

The copolymers according to the invention can be prepared if desired, by a gas-phase copolymerisation process of ethylene with propylene and/or 1-butene and optionally one or more alpha-olefins comprising 5 to 12 carbon atoms, at a temperature in the range $-30°$ to $+40°$ C. in the absence of substantial quantities of chain transfer agent, and in the presence of a catalyst system of the Ziegler-Natta type, possessing a high stereospecificity in the polymerisation of alpha-olefins such as propylene, this catalytic system comprising on the one hand, a catalyst consisting of a titanium compound and on the other hand a co-catalyst consisting of an organo-metallic compound of a metal of Group II or III of the Periodic Table of Elements.

The stereospecificity is measured by the proportion of polypropylene which is insoluble in boiling n-heptane, this proportion being capable of attaining 92% and generally 95% by weight or even more.

The catalyst system which may be utilised in the production of the copolymers of the invention, is preferably chosen from among systems capable of polymerising ethylene and propylene at speeds more or less close to one another. These kinetic properties of the catalyst system, regarding the relative speeds of polymerisation of ethylene and propylene, are determined during the production of an amorphous copolymer according to the invention, by the ratio of the composition in monomers in the reaction gas mixture to that of the monomeric units in the copolymer obtained. Generally the ratio between the compositions in monomers or in monomeric units is comprised between 0.5 and approximately 2.

It is known to copolymerise ethylene and propylene in gas phase at a temperature comprised between 40° and 90° C. in the presence of a catalyst system which is highly stereospecific in the polymerisation of propylene alone, to obtain copolymers containing 34 to 67% ethylene by weight. However these copolymers do not possess a very high molecular weight, their intrinsic viscosity measured at 135° C in decalin being less than 10 dl/g; these copolymers also retain some cristallinity, their fusion enthalpy measured by differential scanning calorimetry being equal or higher than 6 J/g.

It has been unexpectedly observed that the use of a catalyst system which is highly stereospecific in the polymerisation of propylene alone permits the production in the gas phase of a copolymer according to the invention, which is substantially amorphous, possesses a very high molecular weight and which occurs in the form of a powder consisting of solid particles, of a pasty and non-sticky nature. In fact the use of a catalyst system which is not very stereospecific in the polymerisation of propylene, in particular a catalyst system generally utilised for producing high density polyethylene or a copolymer of ethylene and alpha-olefins of a density comprised between 0.900 and 0.940 currently called linear low density polyethylene, leads under the conditions of gas phase copolymerisation to copolymers which are relatively crystalline and which occur nevertheless in the form of pasty and sticky solids which are difficult to handle.

One of the preferred catalyst systems comprises as catalyst, a solid compound based on titanium trichloride obtained for example:

(a) by the reduction of the titanium tetrachloride at a temperature comprised between $-10°$ and $80°$ C., by means of at least one organo-aluminium compound of the formula $$Al\ R_nX_{3-n}$$

in which R is an alkyl, cycloalkyl, aryl or aralkyl group, comprising 1 to 12 carbon atoms, X is an atom of hydrogen, chlorine or bromine, and n is a whole number or fraction which may have any value from 1 to 3, the organo-aluminium compound or compounds being used in a quantity such that the ratio of the number of moles of titanium tetrachloride to the number of organic gramme equivalents of the organo-aluminium compound is comprised between 1.2 and 50 and the reduction being Performed in a liquid hydrocarbon in the presence of 2 to 5 moles per mole of organo-aluminium compound, of one or more aliphatic ethers of the formula $$R'OR''$$

in which R' and R" are the same or different alkyl groups, comprising 1 to 12 carbon atoms;

(b) then, by maintaining the solid compound obtained previously, at a temperature comprised between $20°$ and $115°$ C., for a period comprised between 15 minutes to 24 hours;

(c) and, by washing the solid compound resulting from the second stage by means of a liquid hydrocarbon.

The resulting solid compound consists of particles of regular shape, more or less spherical, of an average diameter by mass comprised between 5 and 100 microns and of narrow particle size distribution, such that in particular less than 1% by weight of the particles have a mean diameter by mass less than 2 microns. This solid compound contains titanium trichloride, aluminium trichloride and an aliphatic ether; it complies with the formula:

$$TiCl_3,\ x\ AlCl_3,\ y\ R'OR''$$

in which
R' and R" have the definitions given above and in which
x is a fraction comprised between 0.005 and 0.1 and
y is a fraction comprised between 0.05 and 0.2.

This solid compound possesses an X-ray diffraction spectrum corresponding to a titanium trichloride of an essentially delta structure, but containing 5 to 20% by weight of titanium trichloride of beta structure.

Prior to its use in copolymerisation, the catalyst is preferably coated by contacting it with one or more alpha-olefins in a quantity such that the coated catalyst obtained contains from 0.05 to 100 g of poly-alpha-olefins per milligramme atom of titanium, this contacting being performed at a temperature comprised between $-20°$ C. and $60°$ C. in the presence of at least one organo-aluminium compound of the formula $$AlR_nX_{3-n}$$

in which R, X and n have the same definitions as above, this organo-aluminium compound being identical or different from that which may be used during the preparation of the catalyst. This contacting may be performed in the presence of a liquid diluent, such as a saturated hydrocarbon or a liquid alpha-olefin, or else in the gas phase, that is to say in the absence of liquid diluent. The alpha-olefins utilised in this contacting can be chosen from amongst ethylene, propylene, 1-butene, 4-methyl-1-pentene, 1-hexene or 1-octene or a mixture thereof. They are advantageously one or more of those used in the course of the gas phase copolymerisation.

The catalyst system also comprises as co-catalyst one or more organometallic compounds of a metal of Group II or III of the Periodic Table of Elements, in particular one or more organoaluminium compounds of the formula $$AlR_nX_{3-n}$$

in which R, X and n comply with the same definitions as above, this organoaluminium compound or compounds being identical or different from those which may be used for the preparation of the catalyst or for the prior contacting of the catalyst with one or more alpha-olefins. These organometallic compounds are advantageously utilised in quantities such that the atomic ratio: metals of the Groups II and III of the co-catalyst/titanium of the catalyst is comprised between 1 and 50. The co-catalyst may be contacted with the catalyst to form the catalyst system prior to the introduction of the catalyst system into the copolymerisation reactor or may be partly or entirely introduced into the copolymerisation reactor separately from the catalyst.

The copolymers according to the invention are advantageously prepared according to a gas-phase copolymerisation process, especially by means of a fluidised bed reactor and/or one which is stirred mechanically. It is particularly important to avoid the use of a process of copolymerisation in the liquid phase, because in this case one obtains copolymers possessing some residual crystallinity, and occurring in the form of particles of pasty and sticky appearance. The gas phase copolymerisation, especially by means of a fluidised bed, and which may be stirred mechanically, may be performed according to conventional techniques. The copolymer in course of formation is maintained in the fluidised state by means of a rising gas stream containing ethylene, propylene and/or 1-butene and optionally the other alpha-olefins to be copolymerised. The reaction gas mixture leaving the reactor is generally cooled before being recycled into the reactor together with a complementary quantity of ethylene and alpha-olefins. The copolymerisation is performed by means of the catalyst system of the Ziegler-Natta type previously described, this catalyst system or its components being introduced continuously or semi-continuously into the fluidised-bed reactor. The withdrawal of the amorphous copolymer may also be effected in a continuous or semi-continuous manner.

The gas-phase copolymerisation is performed at a temperature equal to or greater than −30° C. and less than +40° C., preferably at a temperature equal to or greater than −20° C. and less than +20° C., and more especially at a temperature equal to or greater than −10° C. and less than +10° C., under a total pressure which may vary within a range generally comprised between 0.5 MPa and 4 MPa, preferably comprised between 0.5 and 2.5 MPa.

The reaction gas mixture providing the fluidisation in particular may comprise in addition an inert gas such as nitrogen, methane or ethane. The presence of an inert gas in this reaction gas mixture appreciably improves the elimination of the reaction heat, and favourably modifies the kinetics of the copolymerisation.

The gas-phase copolymerisation is performed substantially in the absence of a chain transfer agent such as hydrogen or diethyl-zinc in the copolymerisation medium.

The upward velocity of the gas mixture in the fluidised bed reactor must be sufficiently high to ensure homogenisation of the fluidised bed and to eliminate effectively the heat evolved by copolymerisation. If necessary, other means of homogenisation can be employed, especially mechanical stirring. The velocity of the gas mixture is generally comprised between 3 and 10 times the minimum velocity for obtaining fluidisation, that is to say generally comprised between 20 and 80 cm/s.

The copolymers according to the invention may be advantageously utilised as drag-reducing agents in the conveyance of oil by pipeline, or as additives to drilling muds. They have the advantage of being easily used in these applications by reason of their substantially amorphous nature, and of procuring the desired effects for relatively small quantities used, generally less than 100 parts per million by weight. Furthermore, in these applications, they have a resistance to mechanical breakdown which is particularly high.

Method for determining the mean diameters by mass (Dm) and by number (Dn) of particles According to the invention, the mean diameters by mass (Dm) and by number (Dn) of the particles of catalyst, coated catalyst or copolymer are measured from microscopic observations, by means of the OPTOMAX image analyser (Micro-Measurements Ltd - Great Britain). The principle of measuring consists in obtaining from the experimental study by optical microscopy of a population of particles, a table of absolute frequency where the number $(n_i)$ are particles belonging to each class (i) of diameters is given, each class (i) being characterised by an intermediate diameter $(d_i)$ comprised between the limits of the said class. According to the approved French standard NF X 11-630 of June 1981, Dm and Dn are provided by the following formulae:

$$\text{mean diameter by mass: } Dm = \frac{\Sigma n_i(d_i)^3 d_i}{\Sigma n_i(d_i)^3}$$

$$\text{mean diameter by number: } Dn = \frac{\Sigma n_i d_i}{\Sigma n_i}$$

The ratio Dm/Dn characterises the particle size distribution; it is sometimes referred to as the "breadth of particle size distribution". Measurement by the OPTOMAX image analyser is performed by means of an inverted microscope which permits of the examination of the suspensions of particles of catalyst, coated catalyst or copolymer with an enlargement comprised between 16 and 200 times. A television camera picks up the images given by the inverted microscope and transmits them to a computer which analyses the images received line by line and dot by dot on each line, in order to determine the dimensions or diameter of the particles and then to classify them.

The following Examples illustrate the present invention.

EXAMPLE 1

(a) Preparation of the catalyst

One operates in a 1-liter glass reactor, equipped with a mechanical stirrer consisting of a parallelepiped flat blade of 35×50×2 mm, rotating at 220 revolutions per minute. The reactor is equipped with a device for heating or cooling through the wall. One introduces into this reactor 380 g (2 moles) of $TiCl_4$, 120 ml n-heptane and 70 g (0.44 mole) of diisoamylether at 25° C. The mixture is heated to 35° C. and at this temperature over 4 hours, there is introduced in a regular manner, a solution at 25° C. obtained by mixing 27 g (0.17 mole) of diisoamylether and 30 g (0.25 mole) of diethylaluminium chloride dissolved in 180 ml of n-heptane.

A precipitate is obtained which is maintained at 35° C. with stirring for 1 hour, then at 65° C. for 2 hours. The precipitate obtained, which contains 0.48 gramme atom of titanium, is washed 5 times by decantation with 500 ml of n-heptane at 65° C. The catalyst thus prepared occurs in the form of a solid violet compound consisting of particles of a more or less spherical shape and with a mean diameter by mass equal to 15 microns; it corresponds to the following overall formula:

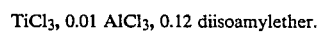

$TiCl_3$, 0.01 $AlCl_3$, 0.12 diisoamylether.

One operates next in a stainless steel reactor holding 5 liters, equipped with a stirring system rotating at 500 rpm. One introduces into it 2000 ml of a suspension in n-heptane of the solid catalyst previously prepared containing 500 milligramme atoms of titanium. One next introduces into the reactor 500 millimoles of diethylaluminium monochloride, and one fixes the temperature of the reactor at 25° C. Then one introduces into the reactor gaseous propylene at a throughput of 60 g/hr for 5 hours. At the end of this period, one stops the introduction of propylene and one maintains with stirring and at the same temperature for 1 hour the suspension of coated catalyst thus obtained. Next one stops the stirring system, one decants the coated catalyst obtained and one carries out 3 washings of the coated catalyst by withdrawal of the supernatant liquid and topping up with 2000 ml of n-heptane. Then one adds to the coated catalyst suspension 1 mole of triethylaluminium and one dries the catalyst system thus obtained under a stream of nitrogen.

The catalyst system contains 1.66 milligramme atom of titanium per gramme of catalyst system; it also contains 0.01 millimole of aluminium trichloride, less than 0.001 millimole of diisoamylether, 2 millimoles of triethylaluminium and 0.6 g of polypropylene per multigramme atom of titanium. Determined by X-ray diffraction, the structure of the titanium trichloride corresponds to the extent of 90% to the delta structure and to the extent of 10% to the beta structure. The catalyst system occurs in the form of particles which are more or less spherical, having a mean diameter by mass of 25 microns and a particle size distribution which is very narrow, such that less than 0.05% by weight of the particles have a diameter of less than 3 microns. The specific surface area of the catalyst is less than 2 $m^2/g$ (BET) and its porosity as determined by nitrogen adsorption is approximately 0.04 $cm^3/g$.

(b) Copolymerisation of ethylene and propylene in a fluidised bed

A fluidised bed reactor in stainless steel having a diameter of 45 cm is provided at its base with a fluidisation grill and operates with a rising gas stream, propelled at an upward velocity of 35 cm/sec and consisting of ethylene, propylene and nitrogen, under the following partial pressures (pp):

pp ethylene=0.064 MPa
pp propylene=0.096 MPa
and pp nitrogen=1.300 MPa

One introduces into this reactor, as charge powder, 100 kg of an inert anhydrous powder of a copolymer of ethylene and propylene, having a composition close to that of the copolymer to be produced and resulting from a previous operation. One introduces next into the reactor in a sequenced manner, at the rate of once every 6 minutes, 10 g of the catalyst prepared previously, the temperature of the reactor being maintained at +5° C. One also introduces into the fluidised bed contained in the reactor, by means of a metering pump, 500 ml per hour of a molar solution of triethylaluminium in n-hexane.

After a period of stabilisation of the copolymerisation conditions, one collects by a sequenced withdrawal about 10 kg/hr of copolymer powder whilst maintaining the weight of the fluidised bed constant. After 12 hours of production under these conditions, one obtains a copolymer powder consisting of particles of spheroidal shape having the following characteristics:

titanium content: 480 ppm;
mean diameter by mass of the particles: 400 microns;
molar content of units derived from ethylene: 51%;
molar content of units derived from propylene: 49%;
intrinsic viscosity (at 135° C. in decalin): 12 dl/g;
fusion enthalpy (DSC): less than 3 J/g;
crystallinity of the polypropylene type (determined by X-ray diffraction): 0%;
crystallinity of polyethylene type (determined by X-ray diffraction): less than 1.0%;
percentage of isolated units derived from ethylene by comparison with the total of units derived from ethylene (determined by $C_{13}$ NMR): 22%;
percentage of units derived from ethylene, arranged in sequences of at least three consecutive units ($C_{13}$ NMR): 11%
density: 0.857;
bulk density: 0.28 $g/cm^3$.
Dm/Dn ratio of the particles : 2.5.

EXAMPLE 2

Copolymerisation of ethylene, propylene and 4-methyl-1-pentene in a fluidised bed One operates exactly as in Example 1.b, except for the fact that one also introduces into the reactor 120 g/hr of 4-methyl-1-pentene. A copolymer powder is obtained consisting of particles of spheroidal shape having the following characteristics:

titanium content: 450 ppm;
mean diameter by mass of the particles: 410 microns;
molar content of units derived from ethylene: 51%;
molar content of units derived from propylene: 48%;
molar content of units derived from 4-methyl-1-pentene: 1%;
intrinsic viscosity (at 135° C. in decalin): 11 dl/g;
fusion enthalpy (DSC): less than 3 J/g;
crystallinity of polypropylene type (X-ray diffraction): 0%;
crystallinity of polyethylene type (X-ray diffraction): less than 1.0%;
density: 0.853;
bulk density: 0.27 $g/cm^3$.
Dm/Dn ratio of the particles: 2.6.

We claim:

1. Amorphous copolymers of ethylene and of one or more alpha-olefins comprising 3 to 12 carbon atoms, which copolymers are characterised in that they have a content of units derived from ethylene comprised between 40 and 60% molar, a content of units derived from propylene and/or 1-butene comprised between 60 and 40% molar and a content of units derived from alpha-olefins comprising 5 to 12 carbon atoms comprised between 0 and 10% molar, an intrinsic viscosity measured at 135° C. in decalin greater than 10 dl/g, a crystallinity level of the polyethylene type measured by X-ray diffraction of less than or equal to 1.0%, no measurable crystallinity of the polypropylene or polybutene type, a fusion enthalpy, measured by differential scanning calorimetry of less than or equal to 3 J/g, and substantially no inversion in the chain formation of units derived from alpha-olefins containing 3 to 12 carbon atoms, these copolymers occurring in the form of a powder consisting of solid, non-sticky particles.

2. Copolymers according to claim 1, characterised in that they have a content of units derived from alpha-olefins comprising 5 to 12 carbon atoms comprised between 0.1 and 5% molar.

3. Copolymsrs according to claim 1, characterised in that they have an intrinsic viscosity, measured at 135° C. in decalin, equal to or greater then 11 dl/g.

4. Copolymers according to claim 1, characterised in that they occur in the form of a powder consisting of solid particles of spheroidal shape having a mean diameter by mass comprised between 100 and 1000 microns, a bulk density comprised between 0.20 and 0.40 $g/cm^3$ and a density comprised between 0.850 and 0.870.

* * * * *

UNITED STATES PATENT AND TRADEMARK OFFICE
CERTIFICATE OF CORRECTION

PATENT NO. : 4,797,461
DATED : January 10, 1989
INVENTOR(S) : Marie-Line Aubanel, et al It is certified that error appears in the above-identified patent and that said Letters Patent is hereby corrected as shown below:

Col. 1, line 13, the word "pipeline" should have a small p

Col. 3, line 39, should read "of these copolymers,"

Col 3, line 65, there is no parenthesis before the word "copolymers"

Col. 5, line 28, the word "performed" should have a small p

Claim 3, line 3, change "then" to --than--

Signed and Sealed this

Twenty-ninth Day of August, 1989

Attest:

DONALD J. QUIGG

Attesting Officer

Commissioner of Patents and Trademarks